Sept. 25, 1951 D. G. AUSTIN 2,568,693
EGG TUMBLING MECHANISM FOR EGG CLEANING MACHINES
Filed July 5, 1949 2 Sheets-Sheet 1

Douglas G. Austin
INVENTOR.

BY *Clarence A. O'Brien*
*and Harvey B. Jackson*
Attorneys

Sept. 25, 1951            D. G. AUSTIN            2,568,693
EGG TUMBLING MECHANISM FOR EGG CLEANING MACHINES
Filed July 5, 1949            2 Sheets-Sheet 2
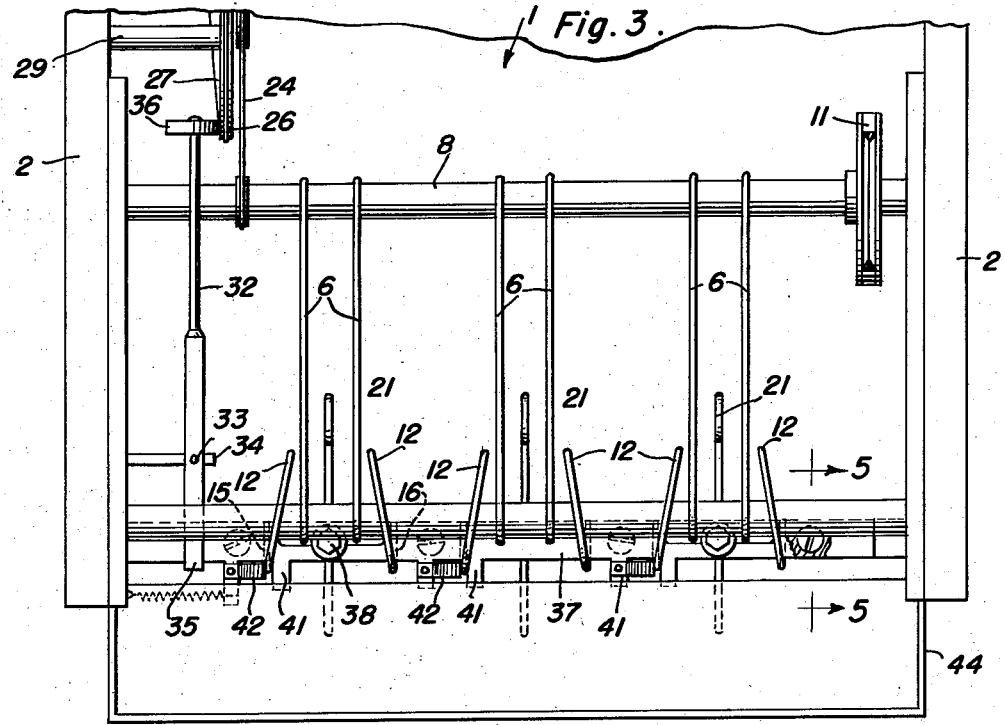
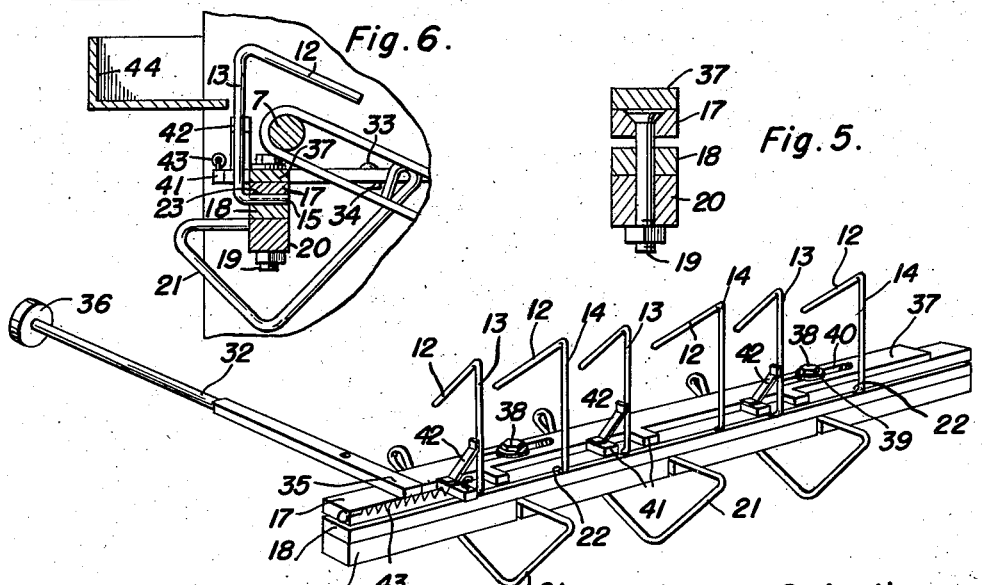
Douglas G. Austin
INVENTOR.

Patented Sept. 25, 1951

2,568,693

UNITED STATES PATENT OFFICE 2,568,693

EGG TUMBLING MECHANISM FOR EGG CLEANING MACHINES

Douglas G. Austin, Wellsboro, Pa.

Application July 5, 1949, Serial No. 102,985

5 Claims. (Cl. 51—103)

My invention relates to improvements in egg tumbling mechanism for egg cleaning machines of the type forming the subject matter of my copending application Serial No. 49,775, filed September 14, 1948, has become Patent No. 2,551,310 dated May 1, 1951 and of which the instant application is a continuation-in-part.

The primary object of my invention is to provide, in a machine in which a plurality of eggs are fed to an abrasive power operated cleaning reel, power operated mechanism for causing the eggs to slowly tumble, or wobble, in a manner to subject all parts of the eggs to the action of the reel and so as to obviate injurious shaking of the eggs, or, breaking thereof while at the same time obtaining uniform cleaning of eggs with different types of shells.

Another object is to accomplish the above by mechanism which is simple in construction, inexpensive to incorporate in such egg cleaning machines, and adapted to withstand wear under prolonged use.

Other and subordinate objects, within the purview of my invention, together with the precise nature of my improvements will be readily understood when the succeeding description and claims are read with reference to the drawings accompanying and forming part of this specification.

In said drawings:

Figure 3 is a view in horizontal section taken on the line 3—3 of Figure 2;

Figure 4 is a view in perspective of parts of the egg tumbling mechanism;

Figure 5 is a view in transverse section taken on the line 5—5 of Figure 3 and drawn to a larger scale;

Figure 6 is a fragmentary view in vertical transverse section taken on the line 6—6 of Figure 1.

Figure 1:
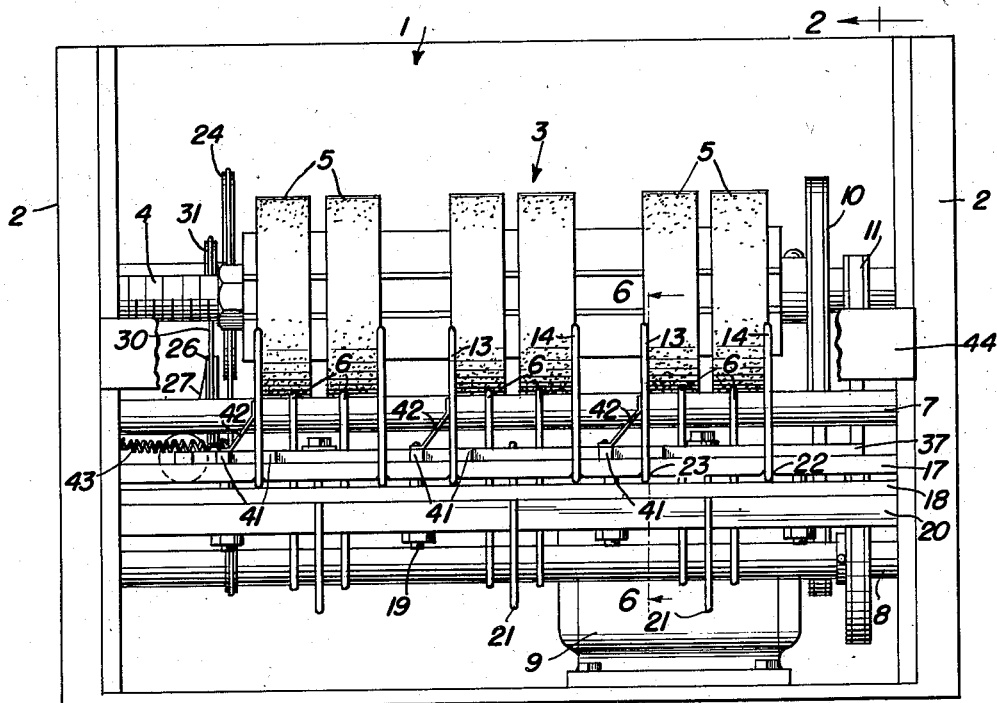
Figure 1 is a view in front elevation illustrating my improved egg tumbling mechanism in a preferred embodiment thereof.
Figure 2:
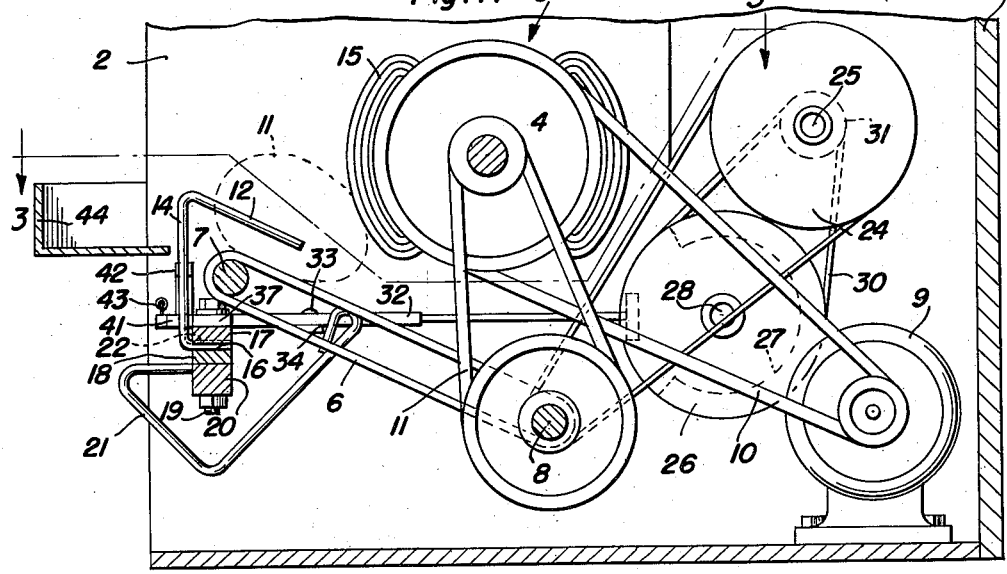
Figure 2 is a view in vertical transverse section taken on the line 2—2 of Figure 1.

Referring to the drawings by numerals, the type of egg cleaning machine with which my invention is especially concerned comprises an open front, open top, rectangular casing 1 having sides 2.

A rotary egg cleaning reel 3 extends across said casing 1, on a reel shaft 4 journaled in the sides 2. The reel 3 carries flexible abrasive cleaning strips 5 extending circumferentially thereof in the form of loops with ends secured to the reel 3 in a manner not important to this invention.

Laterally spaced pairs of egg feeding belts 6 incline, in a common plane, downwardly and rearwardly from the front of the casing 1 below the reel 3 for feeding eggs supported on the pairs of belts to said reel 3 at a downward inclination. A front roller 7, below the axis of the reel 3, and a rear roller 8 below said reel extends across the casing 1 with ends suitably journaled in the sides 2 and support the egg feeding belts 6.

A motor 9 in the casing 1 connected by a belt and pulley drive 10 to one end of the reel shaft 3 provides for rotating said reel to revolve the strips 5 upwardly in front of said reel.

A belt and pulley drive 11 from said end of the reel shaft 4 to the rear roller 8 operatively connects said reel shaft 4 to said roller 8 for driving the pairs of belts 6 with upper runs of said belts driven toward said reel 3, whereby eggs, one of which is shown in broken lines in Figure 1 at 11, are fed toward the reel 3 when positioned on the top runs of the pairs of belts 6. The eggs 11 are placed on the pairs of belts 6 by hand.

Pairs of acute angled egg guiding rods 13, 14, in each pair, are mounted, as presently described, in front of the egg feeding belts 6 and spaced apart laterally in the pairs upon opposite sides of the pairs of belts 6, said pairs of rods 13, 14 providing rearwardly and downwardly inclining pairs of egg guide arms 12 at opposite sides of the pairs of egg feeding belts 6 and between which the eggs 11 are confined. The guide arms 12 of the pairs converge rearwardly, relatively, and lie below the longitudinal axes of eggs 11 placed between the same with one end of the egg facing the reel 3. The egg guiding rods 13, 14 have right angled lower ends 15, 16 interposed between a pair of upper and lower bars 17, 18 extending across the front of the casing 1, below the front roller 7, with the lower bar suitably fixed to sides 2 of the casing 1. Screw bolts 19 secure the bars 17, 18 together and a similar lower bar 20 to the lower bar 18. The bar 18 serves to carry egg ejecting rods which need merely be mentioned in passing.

Coming now to my improvements, the lower ends 16 of the egg guiding rods 14 of the pairs are frictionally clamped between said bars 17, 18, in notches 22 in the upper bar 17 so that one rod 14 of each pair 13, 14 may be swung laterally into different set positions, for a purpose presently clear. The lower ends 15 of the egg guiding rods 13, as best shown in Figure 6, are rotatably secured in notches 23 in said bar 17 so that said rods 13 are freely swingable laterally toward and from the set egg guiding rods 14 of the pairs.

Power means is provided for swinging the freely swingable egg guiding rods 13 of the pairs 13, 14 comprising the following. A speed reducing belt and pulley drive 24 in the casing 1 adjacent one side 2 thereof operatively connects the rear roller 8 with a rear upper cross shaft 25 in said casing journaled at the ends of in the sides 2.

A pulley 26 in the casing 1 provided with a coaxial arcuate side cam 27 thereon is mounted on a stub shaft 28 suitably journaled in a lateral sleeve 29 on said side 2 of the casing 1.

A belt 30 connects a relatively smaller pulley 31 on the cross shaft 25 to the pulley 26 to provide a reduction drive from said shaft 25 for rotating the cam 27.

A horizontal lever 32 is pivoted intermediate the ends thereof, as at 33, on a lateral arm 34 on the same side 2 of the casing 1 as the sleeve 29. The lever 32 extends forwardly from the cam 27, substantially radially of the pulley 26, with a front end 35 overlapping the upper bar 17, and a rear end roller 36 thereon riding said cam 27 and the side of the pulley 26 on which said cam is provided.

A reciprocating slide bar 37 on the upper bar 17 extends along the same for endwise advance thereon from a normal position, and retraction thereon transversely of the freely swingable egg guiding rods 13. Bolts 38 in the upper and lower bars 17, 18, with washers 39 thereon, and extending through longitudinal slots 40 in the slide bar 37 guide said bar 37.

Pairs of front edge lugs 41 on the slide bar 37 straddle the freely movable egg guiding rods 13 adjacent the axes of swinging movement thereof.

Upstanding leaf springs 42 on one lug 41 of each pair press said rods 13 against the other lugs 41 of the pairs, so that upon advance of the slide bar 37 the freely swingable guiding rods 13 will be pressed yieldingly against the eggs 11 positioned between the pairs of egg guiding rods 13, 14, and upon retraction of said slide bar 37, said rods 13 will be positively swung laterally away from the egg guiding rods 14 and the eggs 11.

A retractile spring 43 is connected to one lug 41 and to the adjacent side 2 of the casing 1 and retracts the slide bar 37 and tensions the same against advance movement.

The front end 35 of the lever 32 abuts one end of the slide bar 37 and holds said bar 37 in normal position against the tension of the spring 43 and when the roller 36 rides on the cam side of the pulley 26.

My described egg tumbling mechanism operates as follows.

Eggs 11 placed on the egg feeding belt 6, between the pairs of guide arms 12, with one end facing the reel 3 are fed to said reel in a direction opposite to the direction of rotation of the reel and are thereby caused to tumble about transverse axes by conjoint frictional drive of said belts 6 and upward wiping action of the cleaning strips 5 against the eggs. By swinging the settable egg guiding rods 14 away from the freely swingable egg guiding rods 13, to space the pairs of guide arms 12 apart a distance greater than the size of the eggs between the ends of said eggs, said eggs will be permitted to wobble sdiewise. Under the action of the cam 27 against the roller 36, the lever 32 is actuated to advance the slide bar 37 and slowly swing the freely swingable egg guiding rods 13 toward the set rods 14 and when the roller 36 rides off the cam 27 onto the pulley 26, the spring 43 retracts said bar 37 to swing the freely swingable egg guiding rods 13 away from the set rods 14. This causes the guide arms 12 of the freely swingable egg guiding rods 13 to alternately engage and disengage the tumbling eggs and vary the tumbling action thereof so that the eggs will tumble in a manner which would not otherwise occur.

The egg cleaning machine illustrated includes a front trough 44 for holding eggs to be cleaned or those already cleaned and which need merely be identified herein.

Any suitable hold down means, not shown, may be provided for the eggs 11 beang cleaned.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In an egg cleaning machine, the combination with a horizontal rotary egg cleaning reel, and a driven pair of side by side belts supporting and feeding eggs to said reel laterally thereof, said reel rotating in a direction opposite to the direction of the drive of said belts whereby said reels and belts coact conjointly to cause the eggs to tumble on said belts, of a pair of spaced apart egg guiding members mounted at opposite sides of said pair of belts and confining the eggs tumbling on said belts between said members, one of said members being pivotally mounted for swinging relative to the other to vary the spacing between the pair of members in which said eggs may tumble and thereby vary the tumbling action of the eggs, and power means for swinging the pivotally mounted member.

2. In an egg cleaning machine, the combination with a horizontal rotary egg cleaning reel, and a driven pair of side by side belts for supporting and feeding eggs to said reel laterally thereof, said reel rotating in a direction opposite to the direction of the drive of said belts whereby said reel and belts coact conjointly to cause the eggs to tumble on said belts, of a pair of spaced apart egg guiding members mounted at opposite sides of said pair of belts and confining the eggs tumbling on said belts between said members, one of said members being pivotally mounted for swinging relative to the other to vary the spacing between the pair of members in which said eggs may tumble and thereby vary the tumbling action of the eggs, and power means for swinging the pivotally mounted member comprising a reciprocating slide bar operatively connected to said pivotally mounted member.

3. In an egg cleaning machine, the combination with a horizontal rotary egg cleaning reel, and a driven pair of side by side belts supporting and feeding eggs to said reel laterally thereof, said reel rotating in a direction opposite to the direction of the drive of said belts whereby said reel and belts coact conjointly to cause the eggs to tumble on said belts, of a pair of spaced apart egg guiding members mounted at opposite sides of said pair of belts and confining the eggs tumbling on said belts between said members, one of said members being pivotally mounted for swinging relative to the other to vary the spacing between the pair of members in which said eggs may tumble and thereby vary the tumbling action of the eggs, and power means for swinging the pivotally mounted member comprising a reciprocating slide bar operatively connected to said pivotally mounted member, and a spring tensioned lever for sliding said bar.

4. In an egg cleaning machine, the combination with a horizontal rotary egg cleaning reel, and a driven pair of belts for feeding eggs thereto laterally thereof, said reel and belts acting conjointly to cause the eggs to tumble, of a pair of spaced apart egg guiding members upon opposite sides of said pair of belts confining the tumbling eggs between the same, one of said members being swingable relative to the other to vary the spacing between the pairs and thereby vary the tumbling action of the eggs, and power means for swinging the swingable member comprising a reciprocating slide bar operatively connected to said swinging member, a spring tensioned lever for sliding said slide bar, and a rotary cam for operating said lever in opposition to the spring tensioning the same.

5. In an egg cleaning machine, the combination with a horizontal rotary egg cleaning reel, and a driven pair of side by side belts supporting and feeding eggs to said reel laterally thereof, said reel rotating in a direction opposite to the direction of the drive of said belts said reel and belts coact conjointly to cause the eggs to tumble on said belts, of a pair of spaced apart egg guiding members mounted at opposite sides of said pair of belts and confining the eggs tumbling on said belts between said member, one of said members being pivotally mounted for swinging relative to the other to vary the spacing between the pair of members in which said eggs may tumble and thereby vary the tumbling action of the eggs, and power means for swinging the pivotally mounted member, said pivotally mounted member being spring tensioned to yield under tumbling of eggs against the same and thereby prevent breaking of the tumbling eggs.

DOUGLAS G. AUSTIN.

REFERENCES CITED

The following references are of record in the file of this patent:

UNITED STATES PATENTS

| Number | Name | Date |
|---|---|---|
| 2,018,967 | Miller et al. | Oct. 29, 1935 |
| 2,235,404 | Manggaard | Mar. 18, 1941 |
| 2,276,581 | Jordan | Mar. 17, 1942 |
| 2,457,324 | Shock | Dec. 28, 1948 |